United States Patent
Pao et al.

(10) Patent No.: US 8,441,740 B2
(45) Date of Patent: May 14, 2013

(54) ZOOM LENS

(75) Inventors: Chao-Han Pao, Miao-Li (TW); Jui-Wen Teng, Taoyuan County (TW)

(73) Assignee: Ability Enterprise Co., Ltd., Taipei (TW)

( * ) Notice: Subject to any disclaimer, the term of this patent is extended or adjusted under 35 U.S.C. 154(b) by 69 days.

(21) Appl. No.: 13/198,654

(22) Filed: Aug. 4, 2011

(65) Prior Publication Data

US 2012/0127589 A1    May 24, 2012

(30) Foreign Application Priority Data

Nov. 22, 2010    (TW) .............................. 99140126 A

(51) Int. Cl.
*G02B 15/14*    (2006.01)

(52) U.S. Cl.
USPC ......................... 359/689; 359/676; 359/684

(58) Field of Classification Search .................. 359/676, 359/689, 680–682, 684
See application file for complete search history.

(56) References Cited

U.S. PATENT DOCUMENTS

| | | | |
|---|---|---|---|
| 6,972,908 B2 | 12/2005 | Noda | |
| 7,292,395 B2 | 11/2007 | Noda | |
| 7,817,351 B2 | 10/2010 | Luo | |
| 2009/0091843 A1* | 4/2009 | Ohata | 359/689 |
| 2009/0257132 A1* | 10/2009 | Hayakawa et al. | 359/689 |
| 2010/0128364 A1* | 5/2010 | Agatsuma | 359/689 |

* cited by examiner

*Primary Examiner* — James Greece
(74) *Attorney, Agent, or Firm* — Stout, Uxa, Buyan & Mullins, LLP

(57) ABSTRACT

A zoom lens primarily includes, in order from an object side to an image-forming side, a first lens group having negative refractive power; a second lens group having positive refractive power and at least consisting of a first lens and a second lens; and a third lens group having positive refractive power. The refractive index of the first lens (Nd21), the refractive index of the second lens (Nd22), the total length of the first lens group, the second lens group, and the third lens group (TTL), and the shortest focal length of the zoom lens (fw) satisfy the following conditions: Nd21−Nd22>0.1 and TTL/fw≧1.3.

20 Claims, 6 Drawing Sheets

ZOOM LENS

CROSS-REFERENCE TO RELATED APPLICATIONS

The entire contents of Taiwan Patent Application No. 099140126, filed on Nov. 22, 2010, from which this application claims priority, are incorporated herein by reference.

BACKGROUND OF THE INVENTION

1. Field of the Invention

The present invention relates to a zoom lens, especially to a zoom lens with low cost, small size and good image quality.

2. Description of Related Art

Image-capturing devices, such as digital cameras and digital camcorders, employ zoom lenses and image sensors to collect image beams and turn them into digital signals, for subsequent processing, transmitting, and storage.

Typically, the zoom lens of image-capturing devices consists of several lenses. To offer competitive prices, one or more plastic lenses are employed in the zoom lens; however, conflict may arise between small size and good image quality when reducing the cost.

Therefore, it would be advantageous to provide a novel zoom lens having advantage of compact size and better image quality when reducing the cost.

SUMMARY OF THE INVENTION

An object of the present invention is to provide a novel zoom lens having advantages of compactness and better image quality.

Accordingly, one embodiment of this invention provides a zoom lens that primarily comprises, in order from an object side to an image-forming side, a first lens group having negative refractive power, a second lens group having positive refractive power and at least consisting of a first lens and a second lens, and a third lens group having positive refractive power. The refractive index of the first lens is Nd21, the refractive index of the second lens is Nd22, the total length of the first lens group, the second lens group and the third lens group is TTL, the shortest focal length of the zoom lens is fw, and the following conditions are satisfied: Nd21−Nd22>0.1 and TTL/fw≧1.3.

By the features and conditions described above, the zoom lens of this invention has a compact size and can project as sharp of an image as conventional ones.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations have not been described in detail in order not to unnecessarily obscure the present invention. While drawings are illustrated in detail, it is appreciated that the quantity of the disclosed components may be greater or less than that disclosed, except where expressly restricting the amount of the components.

Figure 1A:
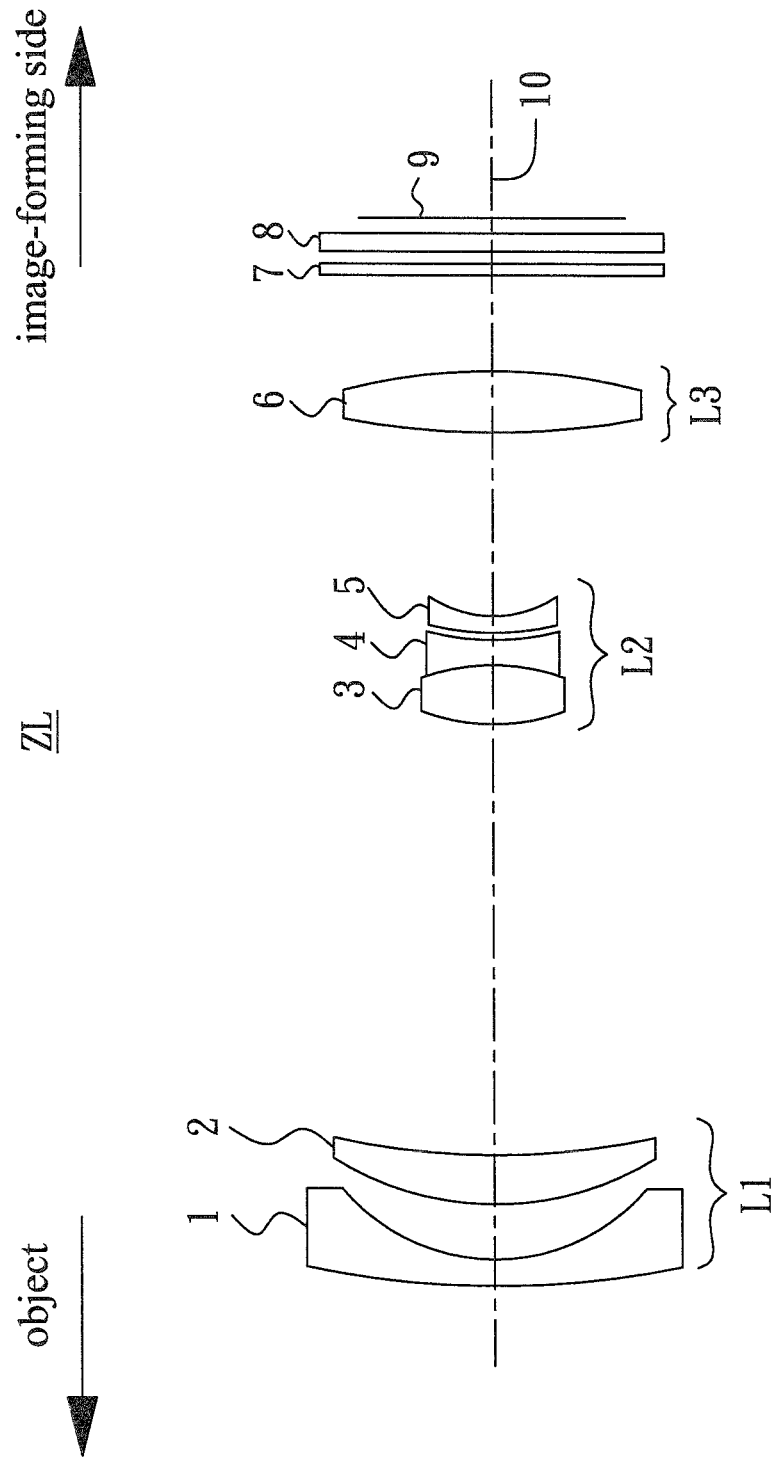
FIGS. 1A and 1B show a zoom lens according to a preferred embodiment of this invention.
Figure 1B:
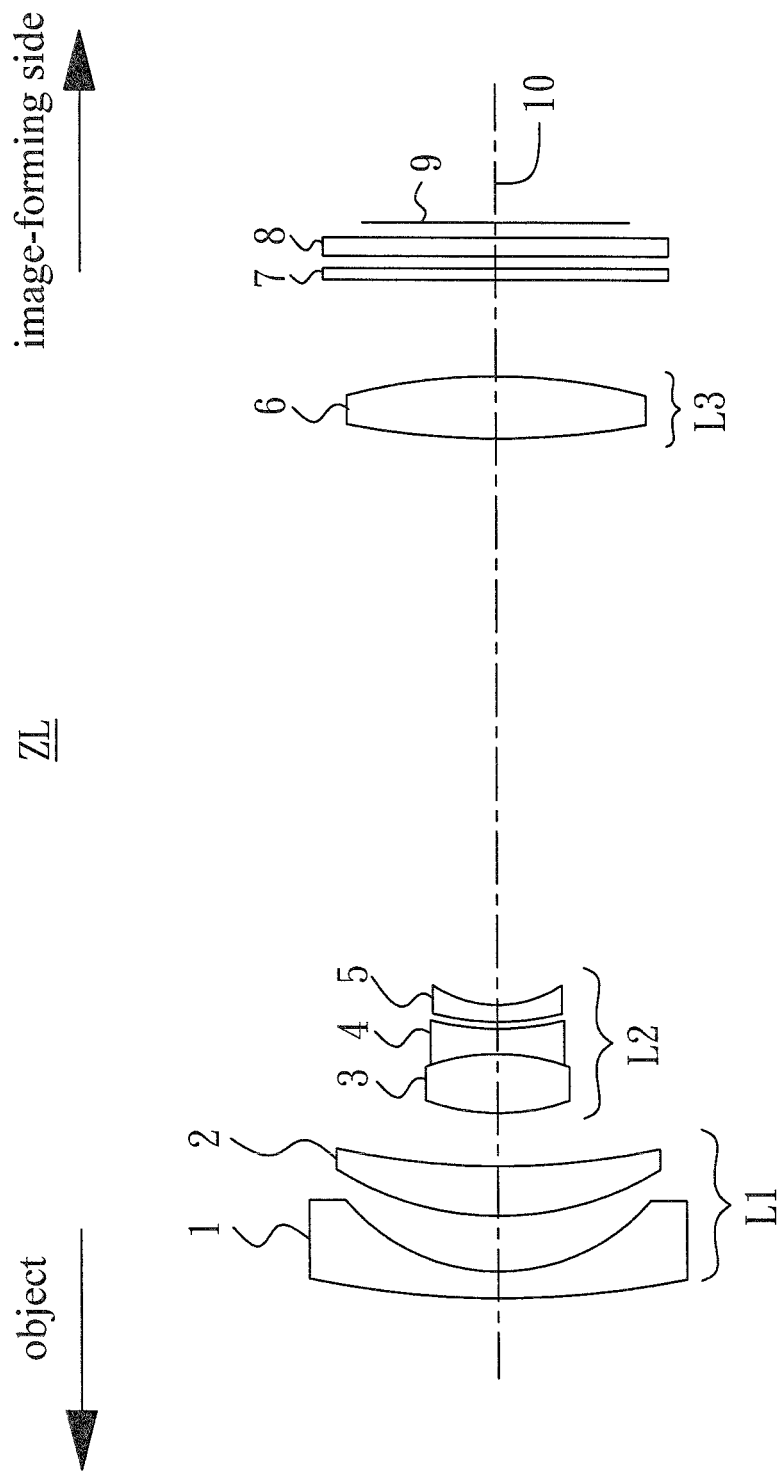

FIG. 1A and FIG. 1B show a zoom lens according to a preferred first embodiment of this invention, wherein FIG. 1A shows the position of every lens in the wide-angle end and FIG. 1B shows the position of every lens in the telephoto end. To highlight the features of this invention, the drawings merely show related components of this embodiment, other irrelevant or minor components are omitted. The zoom lens illustrated by this embodiment may be employed in an image-capturing device, such as a digital camera or a digital camcorder.

In this embodiment, the zoom lens ZL primarily consists, in order from an object side to an image-forming side, of a first lens group L1, a second lens group L2 and a third lens group L3. The first lens group L1 has negative refractive power and consists of a first lens 1 and a second lens 2. The second lens group L2 has positive refractive power and consists of a first lens 3, a second lens 4 and a third lens 5. The third lens group L3 has positive refractive power and consists of a first lens 6. In addition, a flat lens 7 and a flat lens 8 may be arranged between the first lens 6 and an image-forming surface 9. The flat lens 7 may be an IR (infrared rays) filter, and flat lens 8 may be a cover lens. In addition, a stop (not shown) is disposed between the first lens group L1 and the second lens group L2. As shown in FIG. 1A and FIG. 1B, when the users switch the zoom lens from the wide-angle end to the telephoto end, the distance of which between a first lens group and a second lens group, a second lens group and a third lens group, and a first lens group and a third lens group, will be adjusted and moved along an optical axis so as to adjust the focal length of the zoom lens ZL.

Furthermore, the refractive index of the first lens 3 is Nd21, the refractive index of the second lens 4 is Nd22, the total length of the first lens group L1, the second lens group L2 and the third lens group L3 is TTL, the shortest focal length of the zoom lens ZL is fw, and the zoom lens ZL satisfies the following conditions: Nd21−Nd22>0.1 and TTL/fw≧1.3. When satisfying the above conditions, the zoom lens ZL can be more compact.

Additionally, in a second embodiment of this invention, the focal length of the first lens 3 is f21, the focal length of the second lens group L2 is $f2_G$, and the zoom lens satisfies the following condition: $f21/f2_G \leq 0.93$. When satisfying the above condition, the zoom lens ZL can be more compact.

Furthermore, in a third embodiment of this invention, the Abbe number, of the first lens 3 is V21, the Abbe number of the second lens 4 is V22, and the zoom lens ZL satisfies the following condition: V21−V22>14. When satisfying the above conditions, the optical aberration of the zoom lens ZL can be adjusted efficiently.

In this preferred embodiment, the first lens 1 of the first lens group L1 is a negative convex-concave lens having a convex surface toward to the object side, the second lens 2 of the lens group L2 is a positive concave-convex lens having a convex surface toward to the object side, the first lens 3 of the second lens group L2 is a positive biconvex lens, the second lens 4 of the second lens group L2 is a negative biconcave lens, the third lens 5 of the second lens group L2 is a negative convex-concave lens having a convex surface toward to the object side, and the first lens 6 of the third lens group L3 is a positive biconvex lens. In addition, the third lens 3 and the fourth lens 4 are glued to each other as a glued lens. In other embodiments of this invention, the zoom lens ZL may have different configurations.

Typically, the first lens group, the second lens group, and the third lens group respectively comprise at least one aspheric lens or free form lens, and respectively comprise at least one plastic lens. In the preferred embodiment of this invention, the second lens 2 of the first lens group L1, the third lens 5 of the second lens group L2, and the first lens 6 of the third lens group L3 may be free form lenses or aspheric lenses, in which at least one surface of the free form lenses is a free form freedom surface and at least one surface of each aspheric lens is an aspheric surface satisfying the following equation:

$$Z = \frac{CY^2}{1+\sqrt{1-(K+1)C^2Y^2}} + A_4Y^4 + A_6Y^6 + A_8Y^8 + A_{10}Y^{10},$$

where Z is the coordinate in an optical axis direction in which direction light propagates as positive, $A_4$, $A_6$, $A_8$, and $A_{10}$ are aspheric coefficients, K is conic constant, R is the radius of curvature, C is reciprocal of R (C=1/R), Y is the coordinate in a direction perpendicular to the optical axis in which the upward direction as positive, and coefficients of each aspheric lens are predetermined to determine the focal length and thus satisfy the above-mentioned condition.

Table 1 shows the detail information of the zoom lens according to an embodiment of this invention. The information includes the curvature radius, the thickness, the refractive index and the Abbe number (the chromatic dispersion coefficient) of every surface number in the zoom lens; and the range of the focal length f is from 6.45 mm to 18.59 mm, the range of the aperture F number is from 3.06 to 5.6, wherein the numbers of the surfaces are sequentially ordered from the object side to the image-forming side. For example, "S1" stands for the surface of the first lens 1 toward to the object side, "S2" stands for the surface of the first lens 1 toward to the image-forming side, "S3" stands for the surface of the second lens 2 toward to the object side, and so on. Besides, the "thickness" stands for the distance between one surface and the next, wherein "thickness 4", "thickness 10" and "thickness 12" stand for the differences of the distances from the wide-angle end and the telephoto end, which are shown in Table 2. In addition, the surface of the flat lens 7, which toward to the image-forming side, i.e. "S13", may have infrared rays cut coating (IR-cut coating); the surfaces of the flat lens 8, i.e. "S15" and "S16" may be used to protect the image-forming surface 9 of an image sensor, such as a Charge-Coupled Device.

Furthermore, the second lens 2 of the first lens group L1, the third lens 5 of the second lens group L2 and the first lens 6 of the third lens group L3 are plastic aspheric lenses, and the surface number "S3", "S4", "S9", "S10", "S11" and "S12" are aspheric lens surfaces. The aspheric coefficients of the aspheric lens surfaces are listed in Table 3.

In the embodiments of this invention, the zoom lens, the lenses satisfy the mentioned conditions, including: Nd21−Nd22>0.1, TTL/fw≧1.3, V21−V22>14 and $f21/f2_G$≦0.93.

TABLE 1

| surface no. | curvature radius (mm) | thickness (mm) | refractive index | Abbe no. |
|---|---|---|---|---|
| S1 | 31.9678 | 0.70 | 1.755 | 52.3 |
| S2 | 5.7208 | 1.57 | | |
| S3 | 8.8588 | 1.52 | 1.607 | 27 |
| S4 | 20.0000 | thickness 4 | | |
| STOP | infinity | 0.00 | | |
| S6 | 4.9080 | 1.80 | 1.883 | 40.76 |
| S7 | −7.1556 | 0.80 | 1.762 | 26.52 |
| S8 | 9.6488 | 0.07 | | |
| S9 | 5.7816 | 0.60 | 1.607 | 27 |
| S10 | 3.5305 | thickness 10 | | |
| S11 | 23.6223 | 1.70 | 1.544 | 56 |
| S12 | −16.5084 | thickness 12 | | |
| S13 | infinity | 0.30 | 1.516 | 64.1 |
| S14 | infinity | 0.40 | | |
| S15 | infinity | 0.50 | 1.516 | 64.1 |
| S16 | infinity | 0.40 | | |
| Image-forming surface | | | | |

TABLE 2

| thickness | Wide | Tele |
|---|---|---|
| thickness 4 | 12.074 | 0.605 |
| thickness 10 | 5.211 | 16.005 |
| thickness 12 | 2.754 | 1.930 |

TABLE 3

| | K | $A_4$ | $A_6$ | $A_8$ | $A_{10}$ |
|---|---|---|---|---|---|
| S3 | 0.00 | −2.0494E−05 | −9.0751E−06 | 6.3628E−07 | −2.7004E−09 |
| S4 | 0.00 | −3.4396E−04 | −1.6501E−05 | 1.0087E−06 | −2.1589E−08 |
| S9 | 0.00 | −1.2676E−03 | −8.2276E−04 | 1.3380E−04 | −1.5692E−05 |
| S10 | 0.00 | 2.1085E−03 | −7.4884E−04 | 1.6652E−04 | −1.9657E−05 |
| S11 | 0.00 | −5.1291E−04 | −4.3608E−06 | 3.3880E−06 | −1.1504E−07 |
| S12 | 0.00 | −1.6208E−04 | −4.5338E−05 | 6.0951E−06 | −1.7441E−07 |

According to the embodiments of this invention, the mentioned aspheric lenses may be made of polycarbonate, cyclic olefin copolymer (e.g. APEL), polyester resins (e.g. OKP4 or OKP4HT), and the like.

Figure 2A:
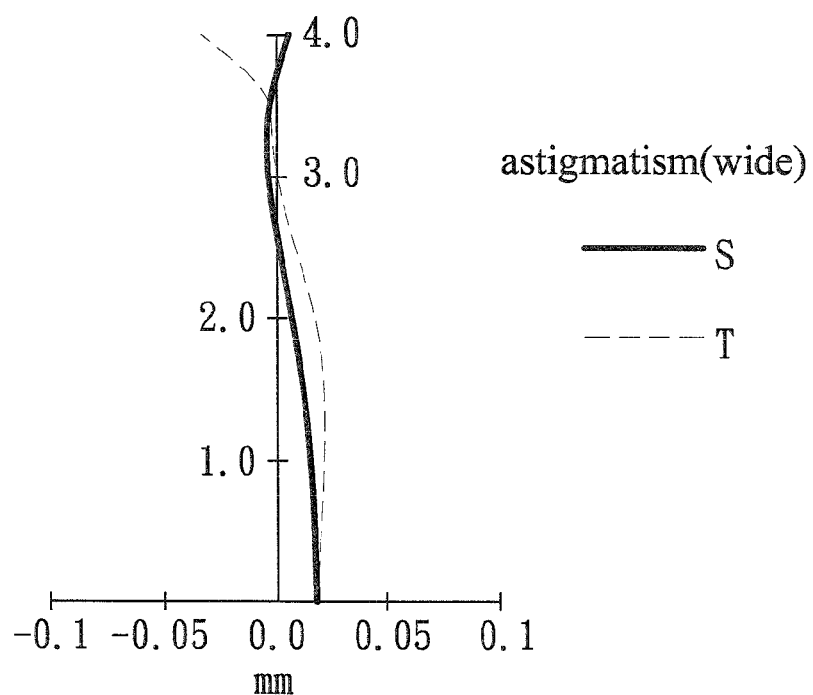
FIGS. 2A and 2B respectively show the astigmatism chart of the zoom lens in an embodiment of this invention, which from the wide-angle end and the telephoto end.
Figure 2B:
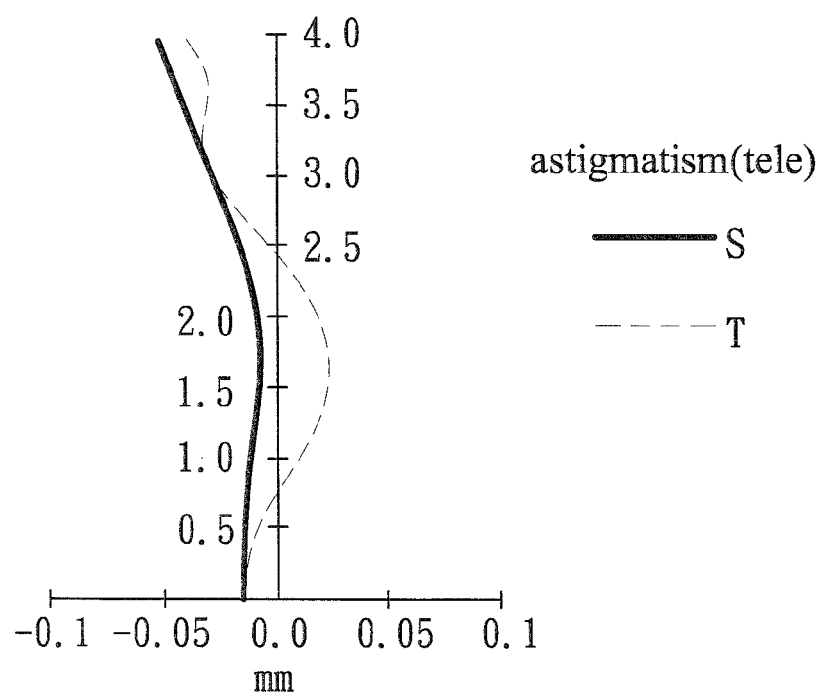

FIGS. 2A and 2B respectively show the astigmatism chart of the zoom lens in an embodiment of this invention, which from the wide-angle end and the telephoto end. Wherein, curve T and S stand for the aberration of the zoom lens to the tangential rays and the sagittal rays; in the wide angle end, S (i.e. tangential value) and T (i.e. sagittal value) are both set in the range of −0.03 mm~0.03 mm; in the telephoto end, S and T are both set in the range of −0.05 mm~0.03 mm.

Figure 3A:
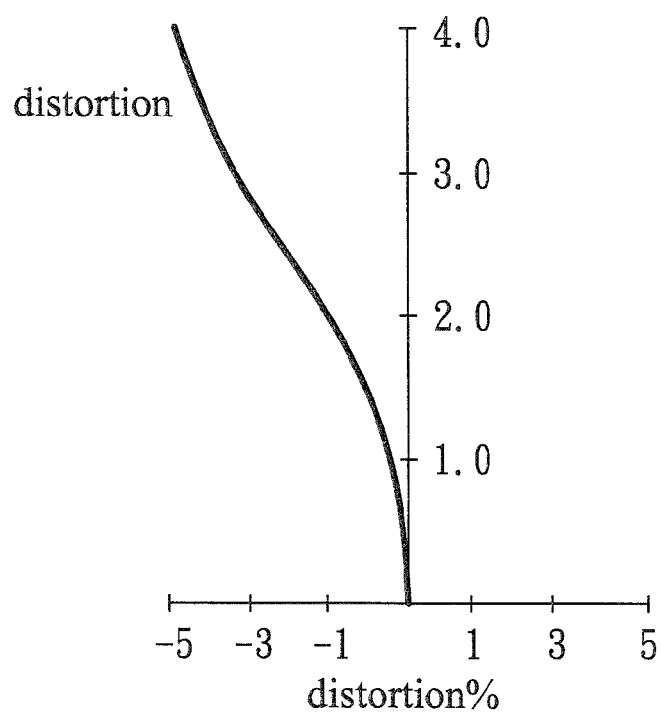
FIGS. 3A and 3B respectively show the distortion chart of the zoom lens in an embodiment of this invention, which from the wide-angle end and the telephoto end.
Figure 3B:
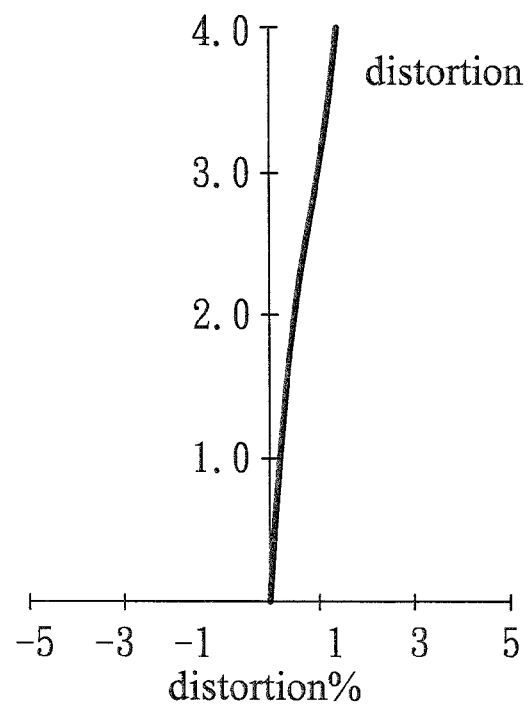

FIGS. 3A and 3B respectively show the distortion chart of the zoom lens in an embodiment of this invention, which from the wide-angle end and the telephoto end. As shown in the drawings, in the wide-angle end the distortion value is set in the range of −5%~0% while 0%~2% in the telephoto end.

Figure 4A:
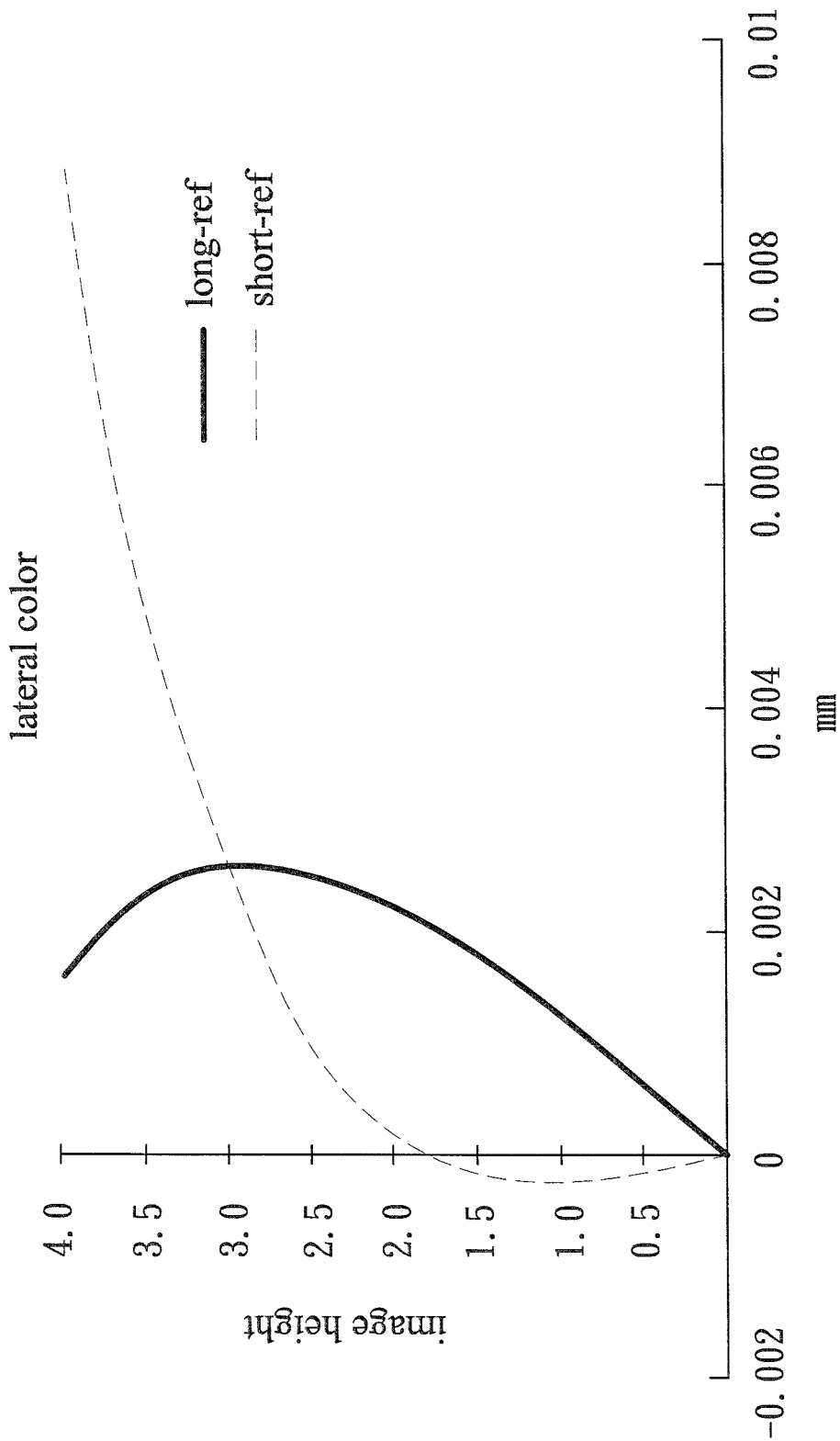
FIGS. 4A and 4B respectively show the lateral color chart of the zoom lens in an embodiment of this invention, which from the wide-angle end and the telephoto end.
Figure 4B:
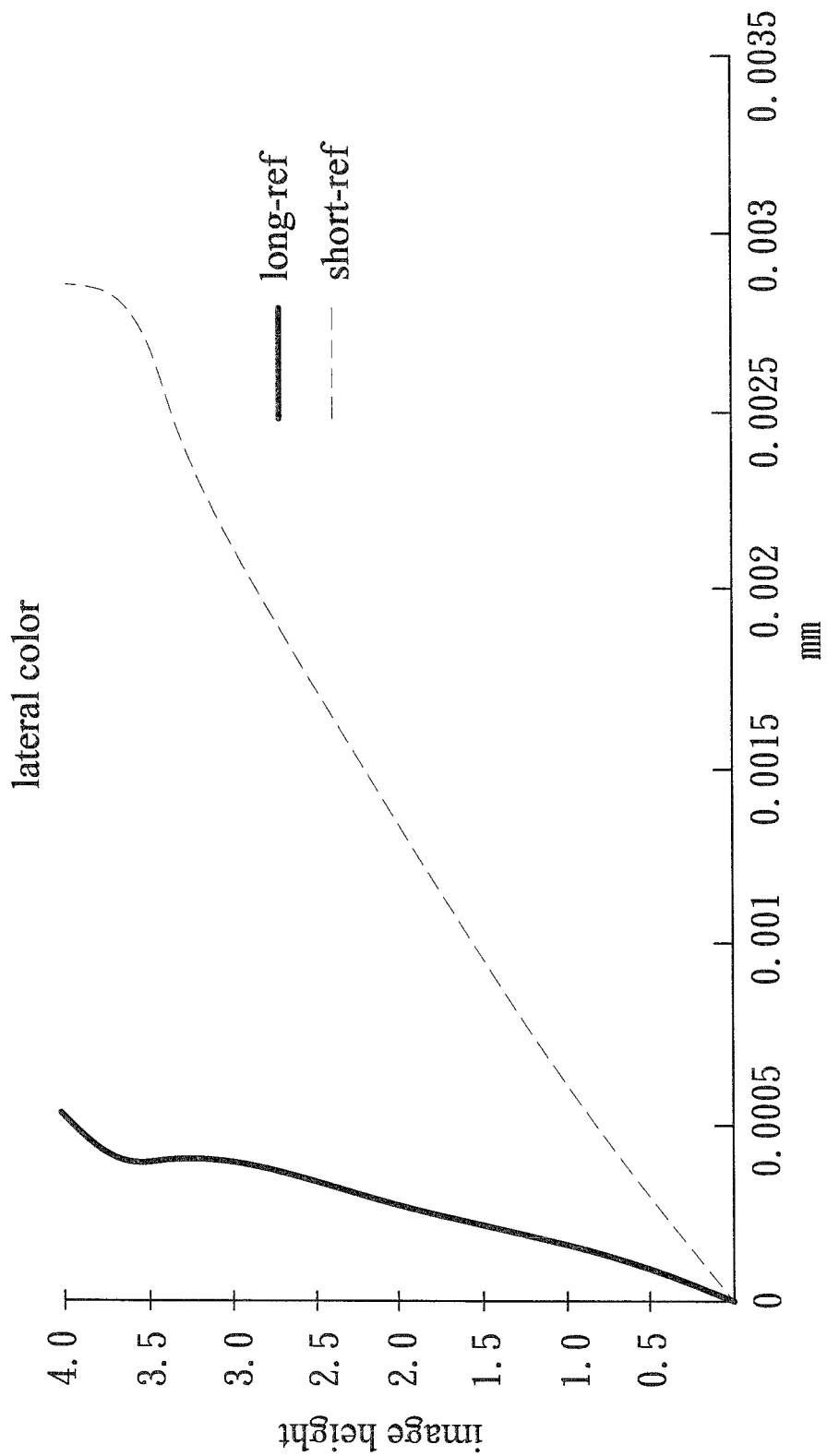

FIGS. 4A and 4B respectively show the lateral color chart of the zoom lens in an embodiment of this invention, which from the wide-angle end and the telephoto end. In which the lateral color for long wavelength and the short wavelength at the wide-angle end will be set in the range of −0.001 mm~0.01 mm while in the range of 0.000 mm~0.003 mm at the telephoto end.

From FIG. 2A to FIG. 4B, the astigmatism, distortion, and the lateral color at the wide-angle end and the telephoto end of the zoom lens will be properly adjusted. Moreover, compared to the conventional zoom lens which consisting of eight or nine lenses, the present invention provides zoom lens containing same image quality. Therefore, by the embodiments of the present invention, the images can be captured as sharp as the conventional zoom lens under the conditions of low cost and compact size.

Although specific embodiments have been illustrated and described, it will be appreciated by those skilled in the art that various modifications may be made without departing from the scope of the present invention, which is intended to be limited solely by the appended claims.

What is claimed is:

1. A zoom lens, in order from an object side to an image-forming side, primarily comprising:
    a first lens group of negative refractive power;
    a second lens group of positive refractive power consisting of a first lens, a second lens and a third lens; and
    a third lens group of positive refractive power;
    wherein the refractive index of the first lens is Nd21, the refractive index of the second lens is Nd22, the total length of the first lens group, the second lens group and the third lens group is TTL, the shortest focal length of the zoom lens is fw, the chromatic dispersion coefficient of the third lens is V23, and the following conditions are satisfied: Nd21−Nd22>0.1, V23<30 and TTL/fw≧1.3.

2. The zoom lens as recited in claim 1, wherein the focal length of the second lens group is $f2_G$, the focal length of the first lens is f21, and the zoom lens satisfies the following condition: $f21/f2_G \leq 0.93$.

3. The zoom lens as recited in claim 1, wherein the chromatic dispersion coefficient of the first lens is V21, the chromatic dispersion coefficient of the second lens is V22, and the zoom lens ZL satisfies the following condition: V21−V22>14.

4. The zoom lens as recited in claim 1, wherein the first lens and the second, lens are glued to be a doublet lens.

5. The zoom lens as recited in claim 1, wherein the first lens group comprises, in order from the object side to the image-forming side, a first lens and a second lens.

6. The zoom lens as recited in claim 5, wherein the first lens of the first lens group has negative refractive power, and the second lens of the first lens group has positive refractive power.

7. The zoom lens as recited in claim 6, wherein the second lens of the first lens group is an aspheric lens or a free form lens.

8. The zoom lens as recited in claim 6, wherein the second lens of the first lens group is a plastic lens.

9. The zoom lens as recited in claim 1, wherein the first lens of the second lens group has positive refractive power.

10. The zoom lens as recited in claim 1, wherein the second lens of the second lens group has negative refractive power.

11. The zoom lens as recited in claim 1, wherein the second lens group further comprises a third lens with negative refractive power disposed between the second lens and the third lens group.

12. The zoom lens as recited in claim 11, wherein the third lens of the second lens group is an aspheric lens or a free form lens.

13. The zoom lens as recited in claim 11, wherein the third lens of the second lens group is a plastic lens.

14. The zoom lens as recited in claim 1, wherein the third lens group comprises a first lens having positive refractive power.

15. The zoom lens as recited in claim 14, wherein the first lens of the third lens group is an aspheric lens or a free form lens.

16. The zoom lens as recited in claim 14, wherein the first lens of the third lens group is a plastic lens.

17. The zoom lens as recited in claim 1, wherein the first lens group, the second lens group, and the third lens group respectively comprise at least one aspheric lens or free form lens.

18. The zoom lens as recited in claim 1, wherein the first lens group, the second lens group, and the third lens group respectively comprise at least one plastic lens.

19. The zoom lens as recited in claim 1, further comprising a stop disposed between the first lens group and the second lens group.

20. The zoom lens as recited in claim 1, further comprising a filter disposed between the third lens group and the image-forming side.

* * * * *